Patented Feb. 23, 1932

1,846,150

UNITED STATES PATENT OFFICE

KARL SCHNITZSPAHN, OF OFFENBACH-ON-THE-MAIN, GERMANY, ASSIGNOR TO GENERAL ANILINE WORKS, INC., OF NEW YORK, N. Y., A CORPORATION OF DELAWARE

SOLID DIAZOAZOCOMPOUNDS

No Drawing. Application filed September 29, 1927, Serial No. 222,942, and in Germany October 5, 1926.

My invention relates to new solid diazoazo-salts of the general formula:

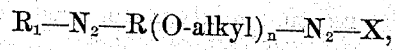

wherein R and $R_1$ each stand for an arylresidue which does not contain either a sulfonic or a carboxylic group, n stands for the number 1 or 2 and X an inorganic anion, such as halogen, or the residue of sulfate or bisulfate and others. The diazoazocompounds may be obtained by diazotizing in the usual manner aminoazobodies, derived from diazocompounds not containing a sulfonic or carboxylic group and aminoderivatives of mono- or polyvalent aryloxalkylethers, such as ortho-aminophenolether, aminocreselether, aminohydroquinone-ethers, 1.2-aminonaptholethers and derivatives capable of forming para-aminoazobodies, and separating the inorganic diazosalts in solid form from the mineral acid diazosolutions thus obtained either by evaporating them at low temperatures or by precipitating the salts.

It was hitherto unknown that the mono-diazoazocompounds of the aforesaid chemical constitution can be isolated in a solid form and that the stability of the solid products is sufficient for the use for dyeing and printing purposes, and only the corresponding diazosolutions freshly prepared from the bases were used hitherto for instance for the process of U. S. A. Patent No. 1,498,417. Therefore the present solid diazoazocompounds are new products, they are orange to reddish brown colored powders, soluble in water with a yellowish to reddish brown color.

The stability and the commercial value of the new solid diazoazocompounds is apparently a consequence of the chemical constitution of the aforesaid aminoazocompounds which are characterized by an alkoxygroup standing in ortho-position to the aminogroup to be diazotized.

The new solid diazocompounds may be mixed with partly or totally dehydrated salts and other suitable diluents. They represent most concentrated diazo preparations ready for immediate use, which yield particularly valuable disazo dyestuffs on fibers.

In order to further illustrate my invention the following examples are given, the parts being by weight and all temperatures in centigrade degrees, but it is understood, that my invention is not limited to the particular products or reacting conditions mentioned therein.

Example 1

To a diazoniumchloride solution, obtained by diazotizing in dilute hydrochloric acid the amino azo body: 4-nitrobenzene-azo-4'-amino-3'-methoxy-6'-methylbenzene, common salt is added. The diazoniumchloride having probably the formula:

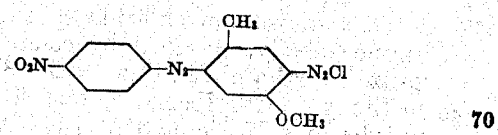

separates in a crystalline form and is filtered and dried at about 40–50°. It is an orange-brown powder, soluble in water with a brownish color.

Example 2

A diazoniumbromide solution, obtained by diazotizing in dilute hydrobromic acid the amino azo body: 2-chloro-benzene-azo-4'-amino-3'.6'-dimethoxybenzene, is salted out by adding potassium bromide. The diazonium bromide having probably the formula:

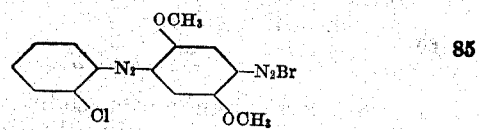

separates in a crystalline form. It is filtered and dried at about 40°.

Example 3

From a diazoniumchloride solution, obtained by diazotizing in dilute hydrochloric acid the para-amino-azo body: 2-nitro-5-methylbenzene-azo-4'-amino-3'-methoxy-6'-methylbenzene, the solid diazoniumchloride is isolated as described above. It corresponds probably to the formula:

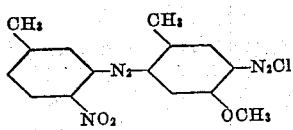

In the same manner the corresponding fluoride may be separated. Both compounds are orange-brown powders soluble in water with a yellowish-brown color.

Example 4

The para-aminoazobody, obtained by combining diazotized ortho-chloroaniline with 1-amino-2-ethoxynaphthalene, is diazotized in dilute hydrochloric acid and from the diazosolution thus obtained the solid diazonium chloride is isolated as described in the foregoing examples. It corresponds probably to the formula:

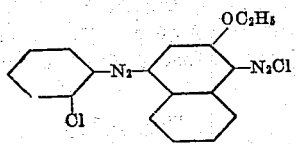

In an analogous manner the solid diazoniumchloride of the para-aminoazobody: 3-nitrobenzene-azo-4'-amino-3'-methoxy-benzene may be obtained.

Example 5

To a diazonium chloride solution of the aminoazobody, obtained by combining diazotized ortho-nitraniline with 3-amino-4-methoxy-1-methylbenzene, one fifth of its weight of sulfuric acid of 78% strength is added. The thereby separated diazoniumsulfate corresponding probably to the formula:

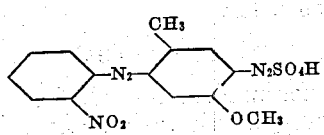

is filtered at low temperatures, mixed in moist condition with partly dehydrated aluminium sulfate and dried. It is an orange-brown powder, soluble in water with a yellowish-brown color.

Example 6

900 parts of anhydrous sodium sulfate are dissolved in a diazoniumchloride solution, prepared from 302 parts of the para-aminoazobody: 4-nitrobenzene-azo-4'-amino-3'.6'-dimethoxy-benzene. Then the mixture is evaporated to dryness in vacuo at about 50°. The diazonium sulfate thus obtained corresponds probably to the formula:

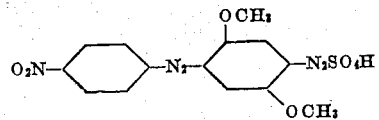

It represents a brownish powder, soluble in water with a brownish color.

The same diazoniumsulfate may be obtained by adding to the aforesaid diazoniumchloride solution 600 parts of sulfuric acid of 78% strength and an amount of sodium sulfate sufficient for saturating the solution. The sulfate thus separating may be filtered, mixed in a moist condition with 400 parts of anhydrous sodium sulfate and dried.

Example 7

The reaction mixture obtained from 257 parts of 2-methoxybenzene-azo-4'-amino-3'-methoxybenzene, 70 parts of sodium nitrate and 2570 parts of sulfuric acid of 95% strength is poured into 10000 parts of ice-water, to which are then added 1600 parts of anhydrous sodium sulfate. The diazoniumsulfate thus separating is filtered off and carefully dried.

Example 8

A diazoniumsulfate solution, prepared from 300 parts of the aminoazobody: 4-nitrobenzene-azo-4'-amino-3'-ethoxy-6'-methylbenzene, 75 parts of sodium nitrate and 6000 parts of sulfuric acid of 78% strength is poured into 900 parts of ice water. The diazoniumsulfate thus separating is filtered off, mixed in a still moist condition with 240 parts of partly dehydrated aluminium sulfate and 480 parts of anhydrous sodium sulfate and dried. It is a brown powder soluble in water with a brownish color.

In an analogous manner the diazonium sulfate of the para-aminoazobody: 2-chlorobenzene-azo-4'-amino-3'-ethoxy-naphthalene is prepared.

I claim:

1. As new articles of manufacture the solid diazoazosalts corresponding probably to the general formula:

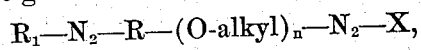

wherein R and $R_1$ each stand for an arylresidue which does not contain either a sulfonic or carboxylic group, $n$ for the number 1 or 2 and X for an inorganic anion, which solid diazosalts are orange to reddish brown powders soluble in water with a yellowish to reddish brown color.

2. As new articles of manufacture the solid diazoazosalts corresponding probably to the general formula:

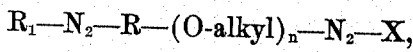

wherein R and R₁ each stand for an arylresidue which does not contain either a sulfonic or carboxylic group, n for the number 1 or 2 and X for a sulfuric acid residue, which solid diazosalts are orange to reddish brown powders soluble in water with a yellowish to reddish brown color.

3. As a new article of manufacture the solid diazoazosalt corresponding probably to the formula:

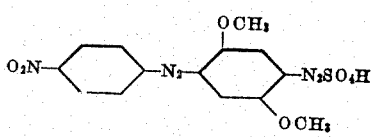

which diazosalt represents a brownish powder soluble in water with a brownish color.

4. As new articles of manufacture the solid diazoazo salts corresponding probably to the general formula:

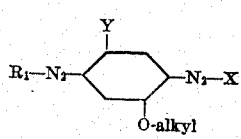

wherein R₁ stands for a benzene nucleus which may contain nitro and/or alkyl groups, X stands for an inorganic anion and Y for an alkyl or alkoxy group, which solid diazoazo salts are orange to reddish-brown powders, soluble in water with a yellowish to reddish-brown color.

5. As a new article of manufacture the solid diazoazo salt corresponding to the formula:

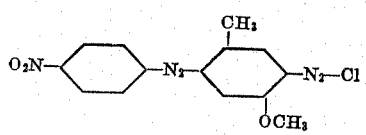

which solid diazoazo salt represents an orange-brown powder, soluble in water with a brownish color.

6. As a new article of manufacture the solid diazoazo salt corresponding to the formula:

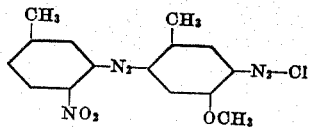

which solid diazoazo salt represents an orange-brown powder, soluble in water with a yellowish-brown color.

In testimony whereof, I affix my signature.

KARL SCHNITZSPAHN.